Jan. 29, 1957
J. H. KNOWLES
2,779,732
ROTARY LIQUID DISTRIBUTOR OF A REACTION DRIVEN
TYPE FOR THE TREATMENT OF WASTE LIQUIDS
Filed July 22, 1953
3 Sheets-Sheet 1
FIG. 1.
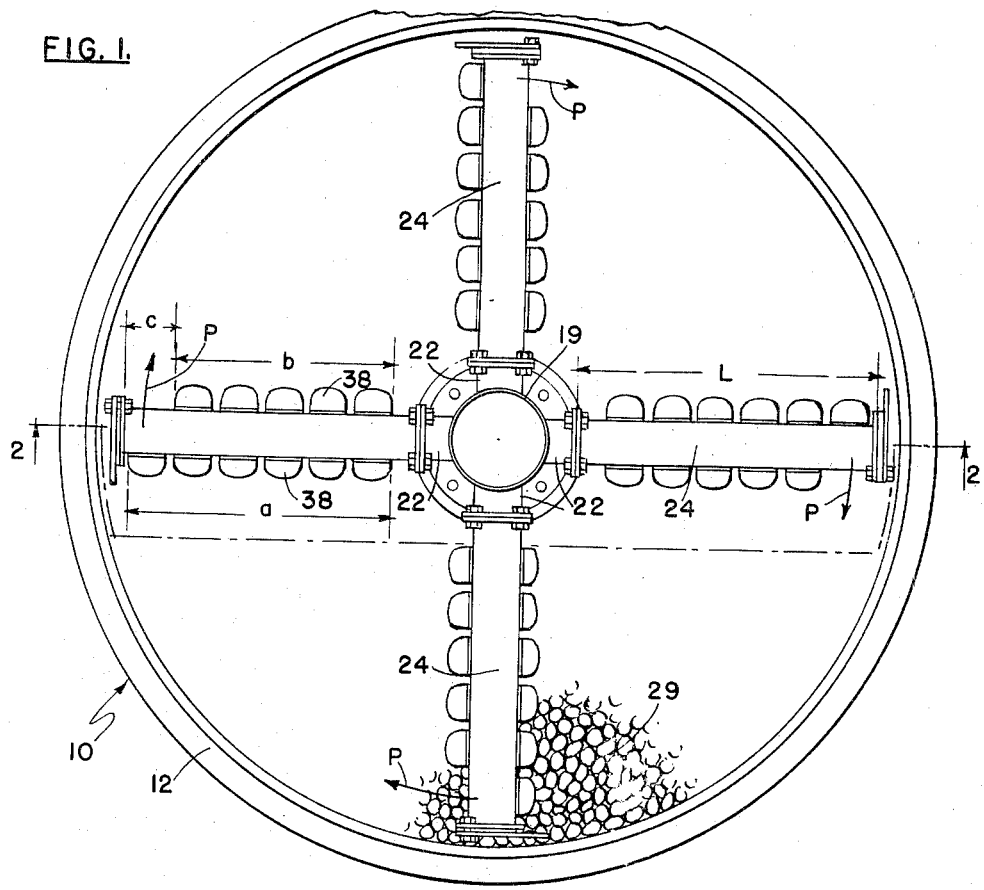
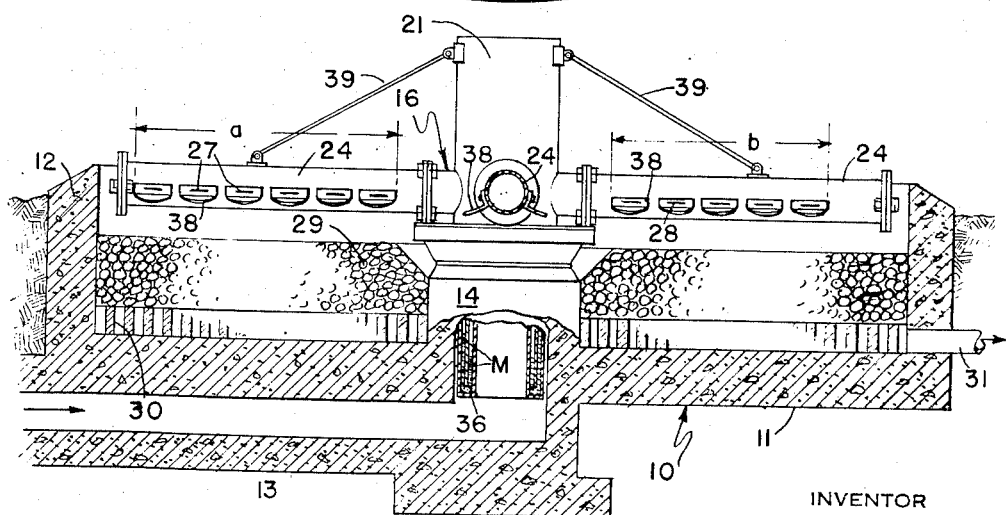
FIG. 2.
INVENTOR
JOHN H. KNOWLES
BY *William J. Fox*
ATTORNEY

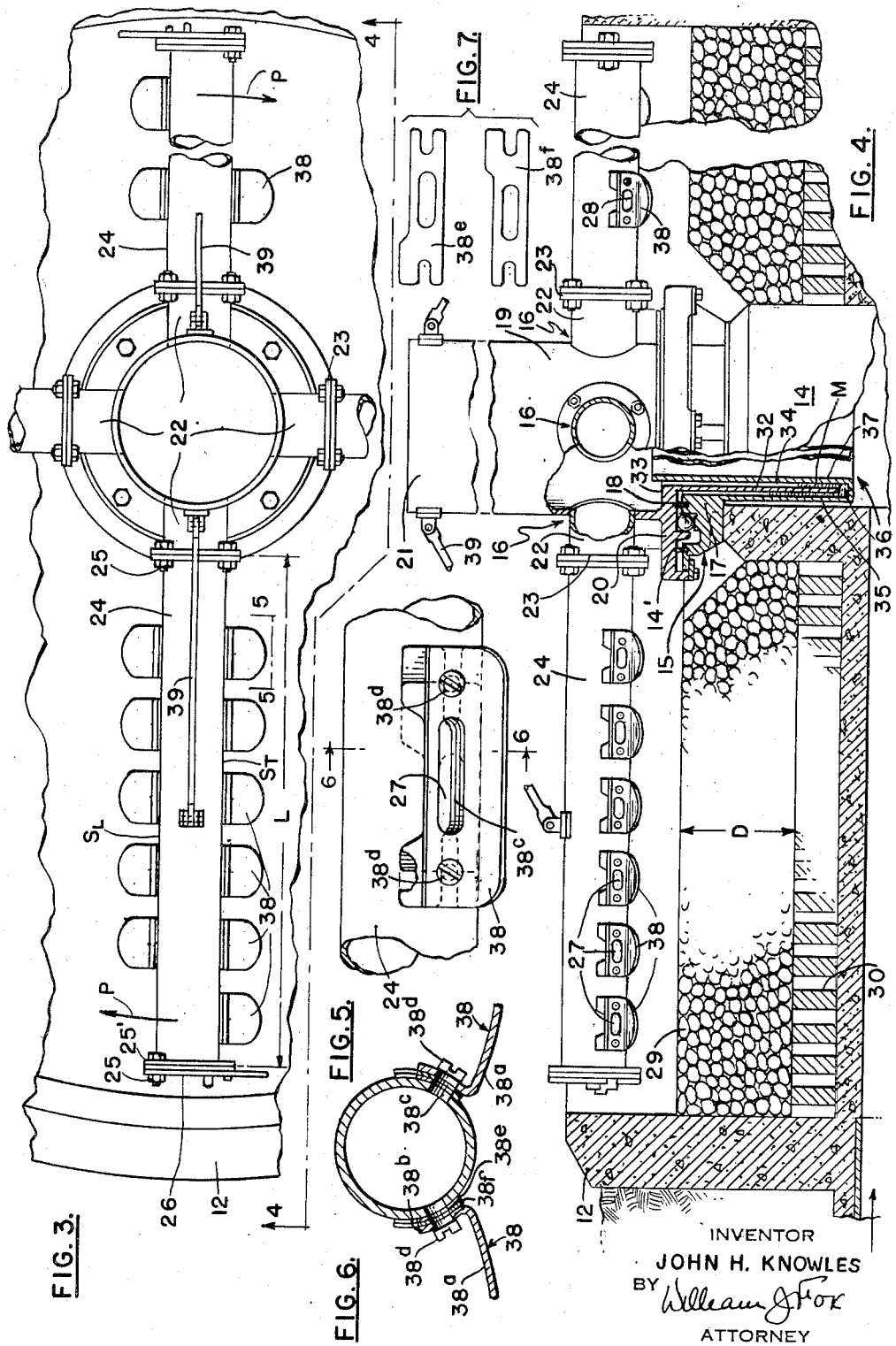

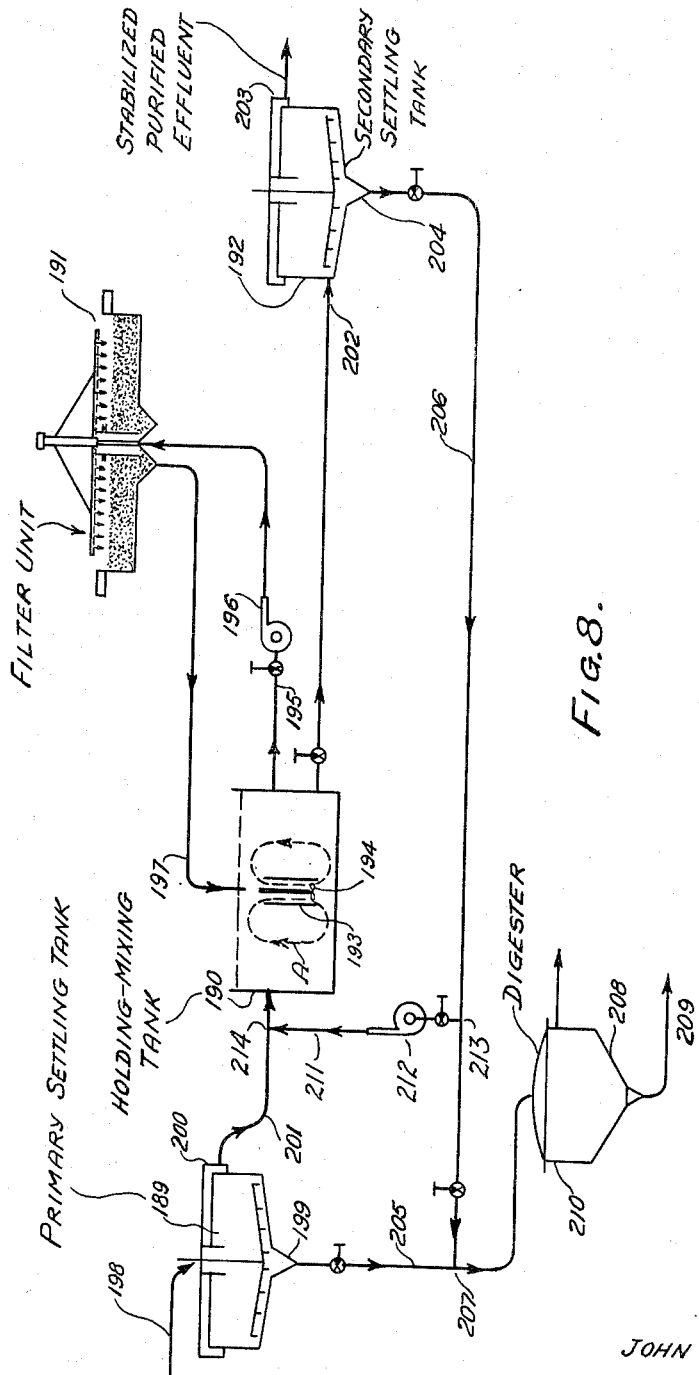

United States Patent Office 2,779,732
Patented Jan. 29, 1957

2,779,732

ROTARY LIQUID DISTRIBUTOR OF A REACTION DRIVEN TYPE FOR THE TREATMENT OF WASTE LIQUIDS

John H. Knowles, Cos Cob, Conn., assignor to Dorr-Oliver Incorporated, a corporation of Delaware Application July 22, 1953, Serial No. 371,123

1 Claim. (Cl. 210—7)

This invention relates to apparatus for the aerobic purification treatment of organically polluted liquids such as sewage and other wastes by subjecting them to aeration and oxidation. More particularly, this invention relates to a distributor of a reaction-driven type which serves to apply such liquid as, for example, sewage to a filter bed of discrete material usually in the form of crushed rock, for the purpose of aeration.

When applied by such distributors the liquid is to spread over the discrete material while gravitating through the bed in countercurrent to a stream of air rising through the interstices of the material in the bed. In this way, the liquid in transit through the filter bed should present large ever-changing surfaces for liquid-air contact in order that the liquid may become aerated and oxidized.

A reaction-driven distributor for applying the liquid to such a filter bed comprises a rotary structure with a vertical axis of rotation, which structure has a central hollow hub portion with a plurality of horizontal radially extending hollow distributing arms each of which has along its trailing side a horizontal row of liquid emitting orifices usually in the form of horizontally elongated openings so shaped and disposed with respect to one another as to deliver therefrom respective sheets of liquid in a desired uniform distribution upon the area of the filter bed. Each such elongated opening is usually provided with a spreader to deliver a fan-shaped sheet or spray of liquid to the top of the filter bed. These sprays or fan-shaped sheets of liquid provide the reactive forces for rotating the structure as long as liquid is applied thereto at an adequate rate and at an adequate pressure head.

The significance of the invention will be more clearly understood and appreciated if considered in the light of the fact that the operation of such filter beds in sewage treatment systems has gone through various stages of development, characterized conspicuously by the respective rates of liquid application or so-called filter loadings which were employed in each respective phase of such development.

In an earlier conventional aerobic treatment system raw sewage was applied to a filter bed by means of a rotary distributor of the general characteristics above outlined, at a rate of the order of 2 million gallons per acre of filter bed area per day, and such a filter was termed a trickling filter the operation of which involves the slow passage of the sewage or organic wastes in what might be termed a trickling manner through a stationary zone or zones of slime or biologic growth (zoogleal jelly) adhering to the discrete material of the filter bed.

As a result of such treatment sewage solids would appear in the filter effluent as zoogleal sloughings from the filter bed material, such sloughing then constituting the biofilter sludge which could then be digested or in some way disposed of.

A later aerobic treatment system according to U. S. Patent to Jenks No. 2,168,208 involving filtration in a different manner where the sewage liquid is applied to the filter by the distributor at a much greater rate, namely at a rate about 5 to 15 times that of the older bio-filter trickling rate, amounting to about 10 to 30 million gallons per acre per day, so that a relatively much smaller filter unit would suffice. In the treatment system according to that patent, filter effluent was recirculated by pumping through the filter accounting for the high application rates. Such a filter is herein to be termed a high rate filter as distinct from the above outlined trickling filter. The high rate filter system as exemplified in the Jenks patent provides for filter effluent to pass to a detention tank where it mixes with raw sewage liquid being fed to that tank. The detention in that tank is long enough to allow biologic growth or biologic flocs to form as a result of aerobic action taking effect, and the flocs to form as a result of aerobic action taking effect, and the flocs would then settle to the tank bottom whence they could be removed by suitable collecting-and-discharging means. In this high rate filter system the rate of application is such that biologic growth upon the filter material is allowed to form only to a relatively much smaller extent than took place and was encouraged in the aforementioned trickling filter, but substantial biologic action was allowed to develop in the detention tank or zone of the high rate filter system.

A more recent proposal provides that filter loadings or liquid application rates be greatly increased beyond what was above termed the high rate filtration rates, by increasing the loading to what will herein be termed "super-rates" of the order of 400 to 600 gallons per acre per day. A treatment system involving such super-rates provides for the filter to operate in closed circuit with a detention tank or zone in such a manner that in effect no biologic growth has a chance or is allowed to develop in the filter itself even though aeration of the liquid and oxidation be allowed to take place extensively during passage of the liquid through the filter bed, the detention zone substantially alone is relied upon to develop the biologic treatment products resulting from aerobic action therein. Liquid containing the suspended solids or aerobic treatment products is bled from the detention zone to a settling zone or tank there to effect the separation of a biologic sludge from the liquor, so that each may be sent to further treatment or otherwise be disposed of. Under these conditions, the filter itself is again greatly diminished in its proportions, but additional and new problems arise with respect to effectively and efficiently applying such super-rate loadings to the available filter bed area by means of a rotary distributor.

This invention concerns itself more particularly with problems arising from such super-rate filtration operation where the rate of liquid application is of such a magnitude as to render the conventional rotary distributing structure inadequate for effectively and efficiently applying corresponding volumes of liquid to the filter bed. That is to say, where by example and normally a usual form of rotary structure might suffice to handle the liquid volume at straight single pass application rates or even at conventional "high-rate" recirculation rates, the application of liquid at "super-rates" presents a problem inasmuch as the distributor arm length available cannot conveniently and efficiently handle the requisite great volume of liquid to be applied to the filter bed. That is to say, the effective usable length of the arms is such that it will not provide requisite orifice area for efficient liquid application to and efficient liquid spreading through the filter bed, for reasons hereinafter more fully explained.

It is among the objects of this invention to provide an improved although simple and inexpensive distributor construction whereby liquid can be applied to the filter bed effectively and efficiently at super-rates.

This invention takes into consideration the fact that the efficiency of super-rate operation may depend upon a variety of factors and upon a manner in which they might be coordinated; as one such factor it considers the speed at which the reactive driving forces rotate the distributor structure, as another factor the thickness of the films of liquid and the manner of liquid distribution throughout the filter bed. The invention thus contemplates that in order to attain maximum filter operating and aerating efficiency at super-rates the liquid film should have a minimum of thickness at optimum uniform distribution throughout the bed, in order that there may be presented maximum liquid-air contact while satisfying super-rates of liquid application.

This invention is based upon the consideration that the streams or horizontal sheets of liquid issuing from respective discharge openings should not be of a thickness so great as to impair the desired subsequent distribution of the liquid where maintaining continuous films of minimum thickness is desirable; nor should they be such as to produce excessive speeds of the rotary structure. The speeds of rotation of the distributor arm should not be so great that the liquid discharging from the openings of one arm may become overlain or overlapped within the filter body by the liquid discharging from the succeeding arm, since such overlap might reduce distribution efficiency in the terms of liquid-air contact; yet the speed of rotation should not drop to a range where it might favor local flooding in the filter bed at the points of application, with the attendant lowering of distribution efficiency in terms of liquid-air contact.

In view of these operational factors pertaining to the manner of liquid application by the distributor, this invention attains its aforementioned objects by providing what might herein be termed the full basic complement of horizontal elongated liquid discharge orifices or openings at the trailing side of each distributor arm, with the orifices so dimensioned, disposed and adjusted, that they will deliver corresponding sheets of liquid at flow rates as high as is practical to satisfy at least a major portion of the high rate flow requirements, but not high enough to induce flooding. This basic full complement of efficiently operating discharge orifices at the trailing side of each distributor arm is augmented according to this invention by a shorter array or row of similar discharge orifices with their individual accessories or spreaders, such further orifices being provided at and along the leading side of each distributor arm. In this way, the reactive forces arising from the basic full complement of discharge openings at the trailing side are in part neutralized or cancelled out by the opposing reaction forces arising from the augmenting discharge openings at the leading side of each arm. Characteristically, the augmenting and opposing row of discharge openings occupies a portion of the length of the distributor arm, extending from the inner end thereof outwardly up to a point where there is left an outer end portion of the arm subject only to the unopposed reaction forces produced by one or more of the discharge orifices of the basic complement. In this way the invention proposes to provide the augmenting discharge openings along the inner end portion of each distributor arm, thereby rendering the rates between the opposed and the unopposed portion of the basic complement of openings to be such as to fulfill (a) given requirements as to discharging the liquid at super-rates and (b) to fulfill corresponding requirements of rotary speed for attaining uniformity and efficiency of liquid distribution throughout the filter bed at such super-rates.

For example, if it be assumed that with a given set of filter operating conditions at super-rates only the one extreme outer discharge opening of the basic contingent of "$n$" discharge openings need be unopposed in order that there be furnished the necessary force or operating torque for satisfying the speed and distribution requirements, then there are available "$n-1$" augmenting opposing discharge openings to accommodate and supply a discharge volume at super-rates. Thus, this invention proposes to build into this super-rate distributor an adjustable ratio of opposed-to-unopposed liquid discharge openings, where the total of all openings—that is, the basic contingent plus the augmenting openings—makes available an effective discharge orifice area large enough to satisfy super-rate operation requirements at high liquid-air contact efficiency.

In summary, the rotary structure of this liquid distributor has provided along the trailing edge of each arm a row of elongated basic discharge openings constituting a basic complement of discharge areas for applying a basic maximum of the liquid to the area of the filter bed. In addition, each arm has provided thereon an opposing row of horizontally elongated supplementary discharge openings disposed along the leading side of each respective arm and representing a supplementary complement of discharge areas. Both the basic discharge openings and the supplementary discharge openings are provided with liquid spreader devices attached to each respective distributor arm. In addition, these spreader devices are associated with adjustable flow throttling means for so adjusting the auxiliary complement relative to the basic complement that the combined adjustments will impart to the rotary structure a rotational speed at which there is attainable efficient application of the liquid to the filter area in terms of maximum liquid-air contact as well as of substantially uniform liquid distribution throughout the bed at a relative maximum rate of application of liquid to the filter area.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim, or of forms that are their functional as well as conjointly cooperative equivalents, are therefore intended to be embraced by that claim.

Figure 1 is a plan view of the super-rate filter showing a 4-arm rotary distributor structure with indications applied thereto pointing up the ratio of the number of opposed to the number of unopposed discharge openings in each arm.

Figure 2 is a sectional view taken on line 2—2 of Figure 1.

Figure 3 is an enlarged detail plan view of the rotary distributor structure taken from Figure 1.

Figure 4 is an enlarged detail sectional view taken on line 4—4 of Figure 3.

Figure 5 is an enlarged detail side view of a portion of the length of a distributor arm taken on line 5—5 of Figure 3, showing the location of one of the elongated discharge openings therein as well as the spreader and deflector means therefor.

Figure 6 shows a cross-section of the distributor arm, taken on line 6—6 of Figure 5, the section being taken through a pair of discharge openings oppositely directed with respect to one another.

Figure 7 shows a pair of shim-like blanking elements to be associated with a discharge opening for adjustably varying the through flow area of a stream of liquid discharging from the distributor arm.

Figure 8 is a diagrammatic flowsheet example of a sewage treatment system employing the super-rate distributor.

The filter construction as a whole comprises the conventional basic elements, namely, a round and relatively shallow concrete tank structure 10 having a bottom 11, a vertical wall 12, a feed inlet conduit 13 underneath the bottom for feeding sewage liquid through the center of the bottom upwardly into the liquid distributor proper. That is to say, a central hollow pier structure 14 rises from the bottom, providing the base for an annular ball-bearing construction 15 for rotatably supporting thereon a rotary distributor structure 16 proper. The bearing construction 15 is here shown to comprise a lower stationary ring element 17 mounted atop the pier, to provide the lower raceway for a set of bearing balls 18. The upper raceway of this ball-bearing structure is provided by the hub portion of the rotary distributor structure 16 itself. That is to say, the distributor structure 16 comprises a hollow hub portion 19 of generally cylindrical configuration having at the bottom a horizontal flange portion 20 providing the upper raceway of the ball-bearing construction. The hub portion 19 further comprises a vertical cylindrical portion 21 rising from the flange portion 20. The hub portion 19 has near its lower end a set of four neck portions 22 extending radially therefrom, and disposed at right angles with respect to one another, each such neck portion 22 having a rigid flange connection 23 with a length L of a distributor arm 24, the flange connections 23 being secured as by bolts 25. Each distributor arm 24 also has an outer end flange 25 provided with a removable end closure device indicated at 26. Each distributor arm 24 is shown to be provided with a combination of lateral discharge openings so arranged along each side of each arm that a net resultant reactive driving force to act upon the extreme end portion of each arm imparts to the distributor structure 16 a rotational movement of such rate of speed as is herein desired in view of the problem of liquid application at super-rates, the significance of which relationship will be set forth in greater detail further below.

According to this invention, each distributor arm 24 has at its trailing side $S_T$ a full complement or full row of liquid discharge openings 27, and at its leading side $S_L$ an incomplete row of discharge openings 28 to act as flow-augmenting openings in occupying a length of the distributor arm extending significantly from the inner end thereof to a point a distance short of the outer end of the arm. Thus, there is provided upon each distributor arm 24 a full complement of discharge openings 27 opposed by an incomplete row of discharge openings 28, leaving one or more discharge openings 27 unopposed at or along the extreme outer end of the arm, to furnish whatever reactive driving force may be required to provide optimum conditions with respect to efficient operation of the liquid distributor at super-rates. In this way, the basic and full complement of discharge openings 27 occupy the full available limit "a" of the arm (see Fig. 1), whereas the flow-augmenting openings 28 occupy a shorter length "b." In this way, the active driving force "P" for each distributor arm 24 is furnished by whatever discharge openings 27 along the outer end portion "c" of the distributor arm at the trailing $S_T$ side thereof are chosen to be unopposed by openings 28 at the leading side thereof.

The specific example according to the drawings provides that only the opening 27 at the extreme outer end of the basic complement of openings along the trailing side of the arm be unopposed, in order that there may be furnished a reactive driving force of a desired magnitude.

With the distributor structure 16 rotating, the combined totals of the streams of liquid discharging from the openings 27 and 28 respectively of each distributor arm 24 are thus applied at a desired optimum of distribution to the filter bed 29 proper shown to comprise an accumulation of or layer of discrete material such as crushed rock or the like. This filter bed 29 proper is of a relatively shallow depth "D" if compared to its horizontal extent, so that the liquid being applied thereto may pass rapidly through this filter bed at the super-rates to be applied thereto for the purpose of this invention. This crushed rock filter bed material is supported upon a drainage structure or grating construction 30 of suitable stone material or the like, whence the filter effluent may discharge by way of an outlet 31.

The rotary distributor structure 16 operates in sealing relationship with respect to the stationary pier 14, there being provided with a liquid-mercury seal of known construction between the stationary pier 14 and the rotary structure 16, this seal to be effective against an hydraulic static pressure head of the feed liquid, to be adequate for the operation of the distributor. That is to say, the flange portion 20 of the rotary structure 16 is unitary with a depending cylindrical sealing member 32 extending downwardly from the inner edge portion 33 of the flange portion 20. The cylindrical sealing member 32 thus extends into a corresponding annular deep trough 34 which in turn is stationary, being unitary with the ring-shaped bearing portion or lower raceway 17. This deep trough 34 comprises an outer depending cylindrical portion 35 extending downwardly from the inner edge portion of the ring member 17 and rigid therewith, an annular horizontal portion 36 extending inwardly from the lower end of the outer cylindrical portion 35, and an inner upstanding cylindrical portion 37 rising from the inner edge of the annular bottom portion 36 and rigid therewith. The rotary cylindrical sealing member 32 has its lower end portion immersed in a bath of heavy sealing liquid such as mercury M contained in the sealing trough 34.

Each of the discharge openings 27 and 28 is provided with a spreader device 38 more clearly shown in detail Figures 5 and 6. This spreader device comprises a stream deflector or lip portion 38a and a flange portion 38b (see Fig. 6) having a horizontal opening 38c substantially matching the discharge openings in the distributor arm 24. This spreader 38 is fastened to the distributor arm as by means of a pair of screws 38d. A pair of restricting insert members 38e and 38f are interposed between the flange portion 38b and the adjoining face of the distributor arm in order that thereby the through-flow area of the discharge opening or orifice may be varied. That is to say, the effective through-flow area of discharge openings 27 or 28 can thus be varied by loosening the screws of 38d to adjust the superimposed relationship of the members 38e and 38f with respect to each other as well as with respect to the discharge openings 27 or 28.

Each distributor arm 24 is braced off against the upright cylindrical hub portion 16 as by means of a guy rod indicated at 39. The annular ball-bearing construction 15 is shown to be provided with a dust seal indicated at 14'.

Suitable environment of such superrate filtration operation is represented in the aerobic purification treatment system of the flow sheet shown in Fig. 8. This treatment system comprises primary sedimentation tank 189, a holding-and-mixing tank 190, a liquid distributor unit 191 for super-rate application such as above described, and a secondary sedimentation tank 192. The holding-and-mixing tank 190 is shown to comprise a central draft tube 193 and a mixing impeller 194 operating therein so that sewage liquid may be circulated and mixed in this tank as is indicated by arrows "A."

The holding and mixing tank 190 operates in circuit with the liquid distributor filter unit 191 by way of transfer conduit 195 with pump 196 leading from the holding tank 190 to the filter unit 191, and a return conduit 197 leading from the filter unit 191 to the holding tank 190.

The primary settling tank 189 receives raw sewage 198 while delivering primary sludge from the tank bottom at 199, and primary effluent with suspended sewage solids by way of an overflow launder 200. A transfer conduit 201 supplies the primary effluent continuously to the holding and mixing tank 190 while mixed aerated sewage is being withdrawn from that tank through conduit 202 for delivery to the secondary settling tank 192 which in turn delivers so-called purified effluent by way of an overflow launder 203 while discharging secondary settled sludge from the tank bottom at 204.

A discharge conduit 205 for sludge from the primary sedimentation tank 189 joins a sludge discharge conduit 206 from the secondary sedimentation tank at a junction point 207, so that the joint sludges may pass for example to a digester 208 delivering digested sludge at 209 and digester supernatant effluent at 210. A conduit 211 with pump 212 leads from point 213 of conduit 206 to point 214 of conduit 201, so that a suitable quantity of sludge solids derived from secondary sedimentation may be returned to the holding tank 290 for the purpose of maintaining and sustaining the aerobic activity in that treatment stage.

The rate of recirculation through the filter unit may be, for example, on the order of 40 to 1.

I claim:

A filter unit for the aeration treatment of organically polluted liquids, having a filter bed of discrete material and a rotary type reaction driven liquid distributor for applying liquid to a filter bed, and in which the rotary structure has a hollow hub portion, a plurality of hollow distributing arms extending radially and horizontally from said hub portion, to rotate about a vertical axis, and means for supplying liquid through said hub portion to said distributor arms, each arm being reaction driven by the liquid discharging laterally of said arms under the influence of a pressure head; said rotary structure being characterized thereby that there is provided along the trailing side of each arm a row of elongated basic discharge openings constituting a basic complement of discharge areas for applying a basic maximum of the liquid to the area of the filter bed, and an opposing row of horizontally elongated supplementary discharge openings disposed along the leading side of each respective arm representing a supplementary complement of discharge areas, said basic openings and said supplementary discharge openings being provided with correspondingly shaped spreader devices attached thereto, with the addition of adjustable flow throttling insert means associated with said spreader devices and their respective arms for so adjusting the throughflow area of individual basic discharge openings as well as of the individual supplementary discharge openings, and for so adjusting said auxiliary complement relative to said basic complement, that the combined adjustments will impart to the rotary structure a rotational speed at which there is attainable efficient application of the liquid to the filter area in terms of a maximum of liquid-air contact as well as of substantially uniform liquid distribution throughout the bed, at a relative maximum rate of application of liquid to the filter area.

References Cited in the file of this patent

UNITED STATES PATENTS

| | | |
|---|---|---|
| 1,813,807 | Kettering | July 7, 1931 |
| 2,168,208 | Jenks | Aug. 1, 1939 |
| 2,225,836 | Lund | Dec. 24, 1940 |

FOREIGN PATENTS

| | | |
|---|---|---|
| 553,125 | Great Britain | May 7, 1943 |